Dec. 9, 1924.  
H. H. REIBER  
1,518,221  
VALVE  
Filed June 27, 1922    5 Sheets-Sheet 3

INVENTOR  
Herbert H. Reiber  
BY Joshua R. H. Potts  
HIS ATTORNEY

WITNESSES:

Dec. 9, 1924.

H. H. REIBER 1,518,221

VALVE

Filed June 27, 1922   5 Sheets-Sheet 5

INVENTOR
Herbert H. Reiber
BY Joshua R. H. Hobbs,
HIS ATTORNEY

Patented Dec. 9, 1924.

1,518,221

UNITED STATES PATENT OFFICE.

HERBERT H. REIBER, OF PHILADELPHIA, PENNSYLVANIA.

VALVE.

Application filed June 27, 1922. Serial No. 571,305.

*To all whom it may concern:*

Be it known that I, HERBERT H. REIBER, a citizen of the United States, residing at Philadelphia, in the county of Philadelphia and State of Pennsylvania, have invented certain new and useful Improvements in Valves, of which the following is a specification.

My invention relates to valves and among the objects are to provide a valve casing and valve which may be used to connect pipes extending at different angles; to provide a valve casing which may be used in close or cramped places where ordinary valves and fittings could not well be used; to provide a valve and casing having several pipe connections, and to provide a valve which may be economically produced and easily assembled and connected.

These objects, and other advantageous ends which will be described hereinafter, I attain in the following manner, reference being had to the accompanying drawings in which—

Figure 1:
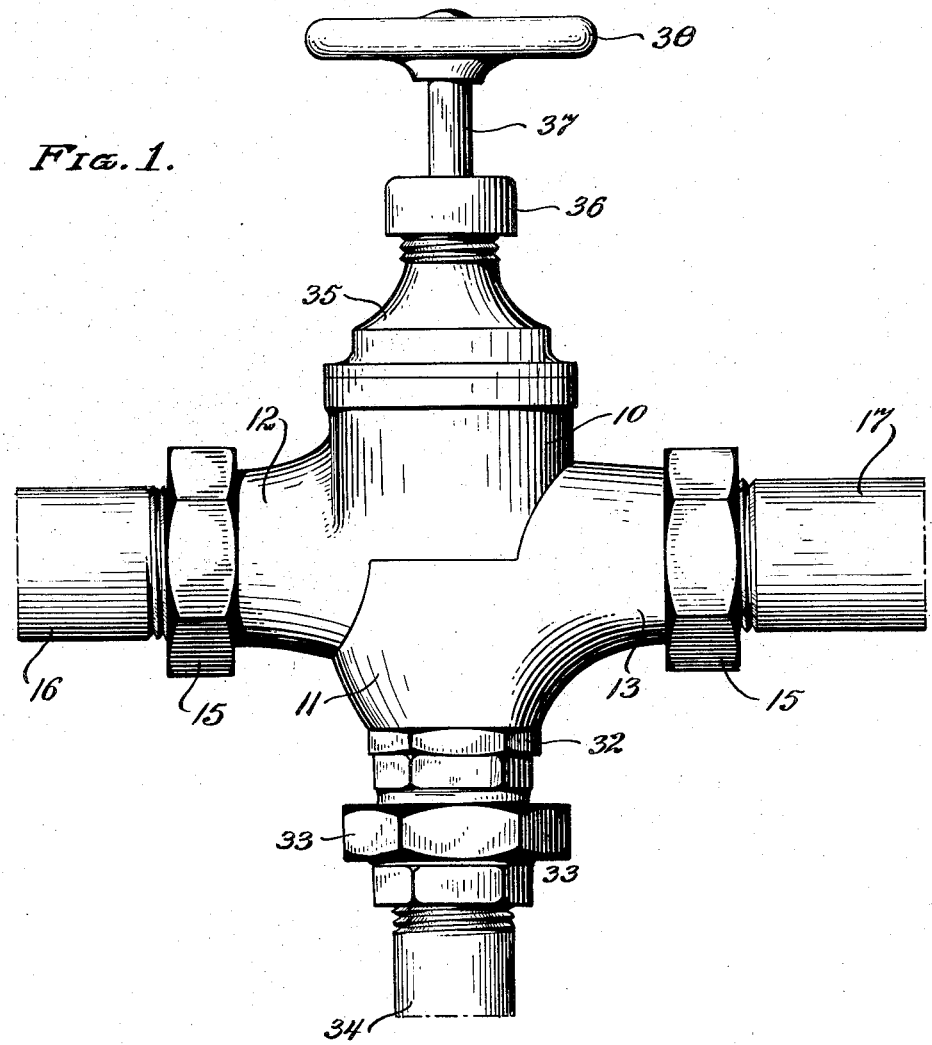
Figure 1 is a side elevation of the improved valve.
Figure 2:
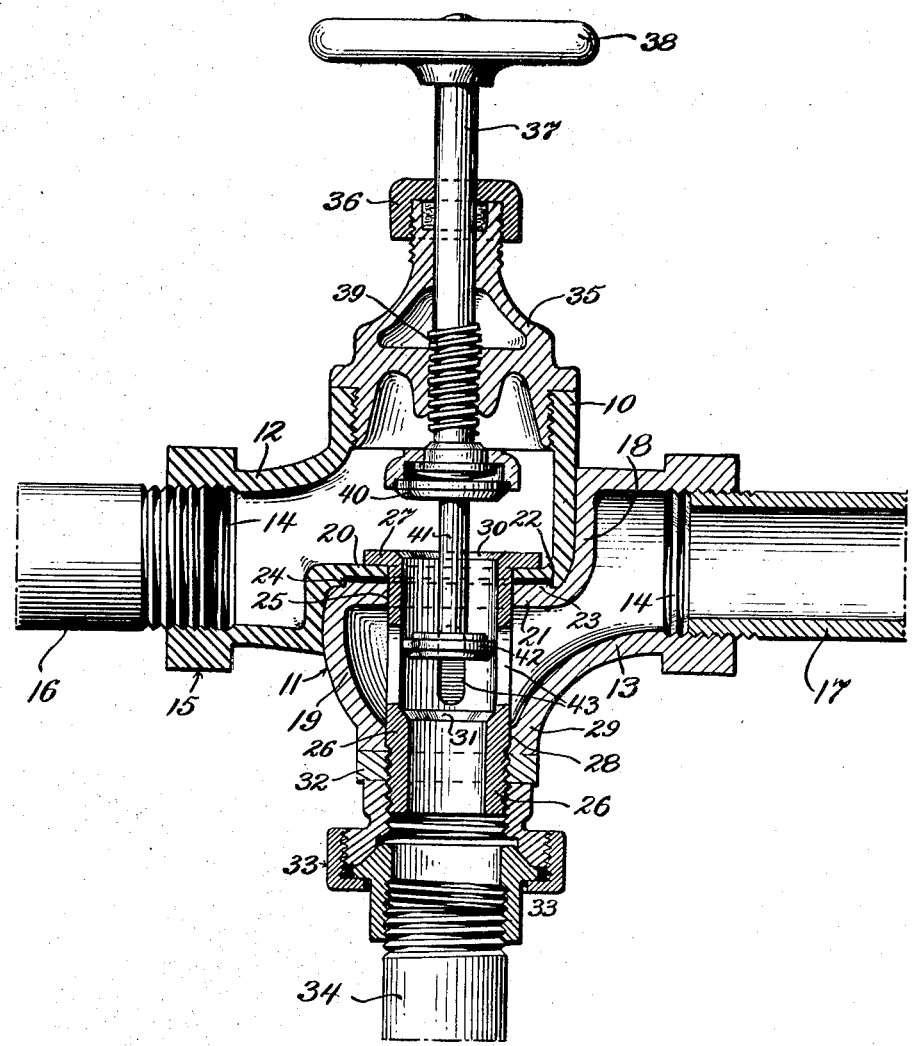
Figure 2 is a central vertical sectional view.
Figure 3:
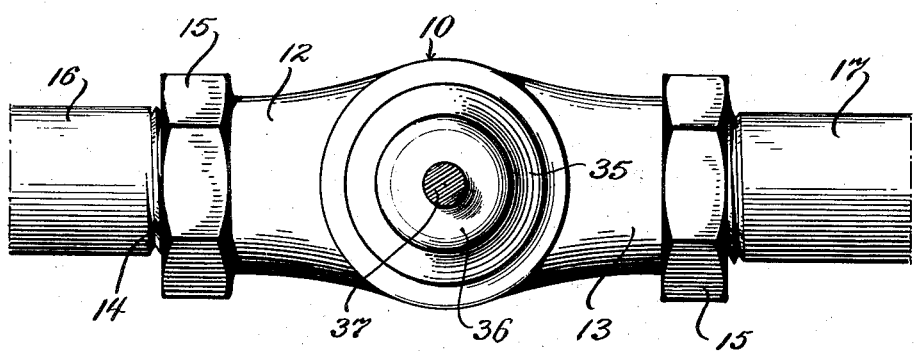
Figure 4:
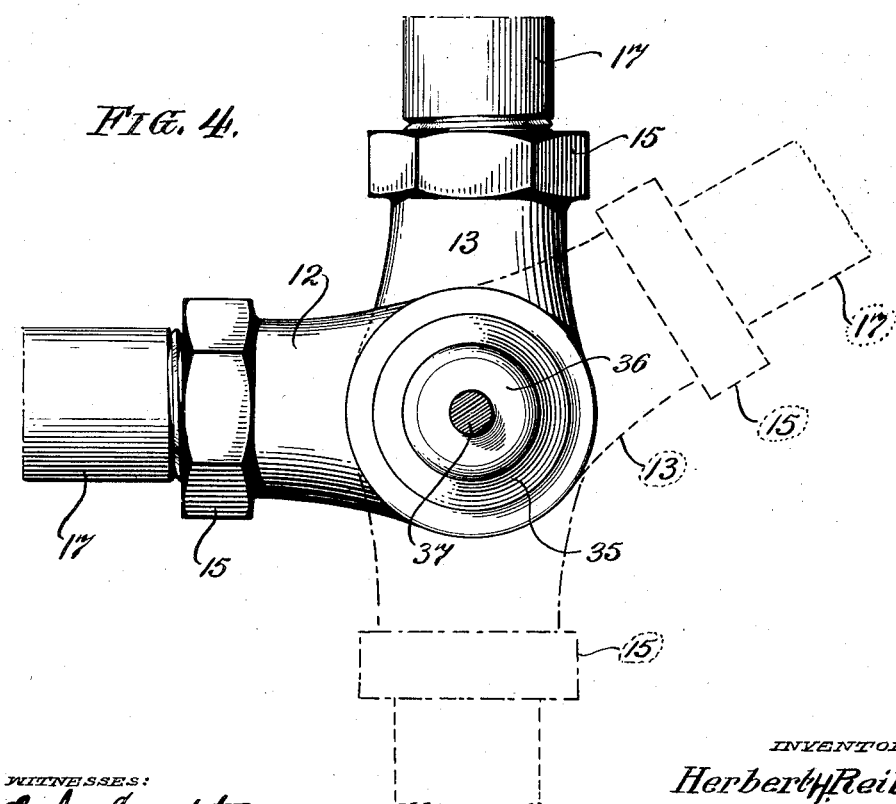
Figure 5:
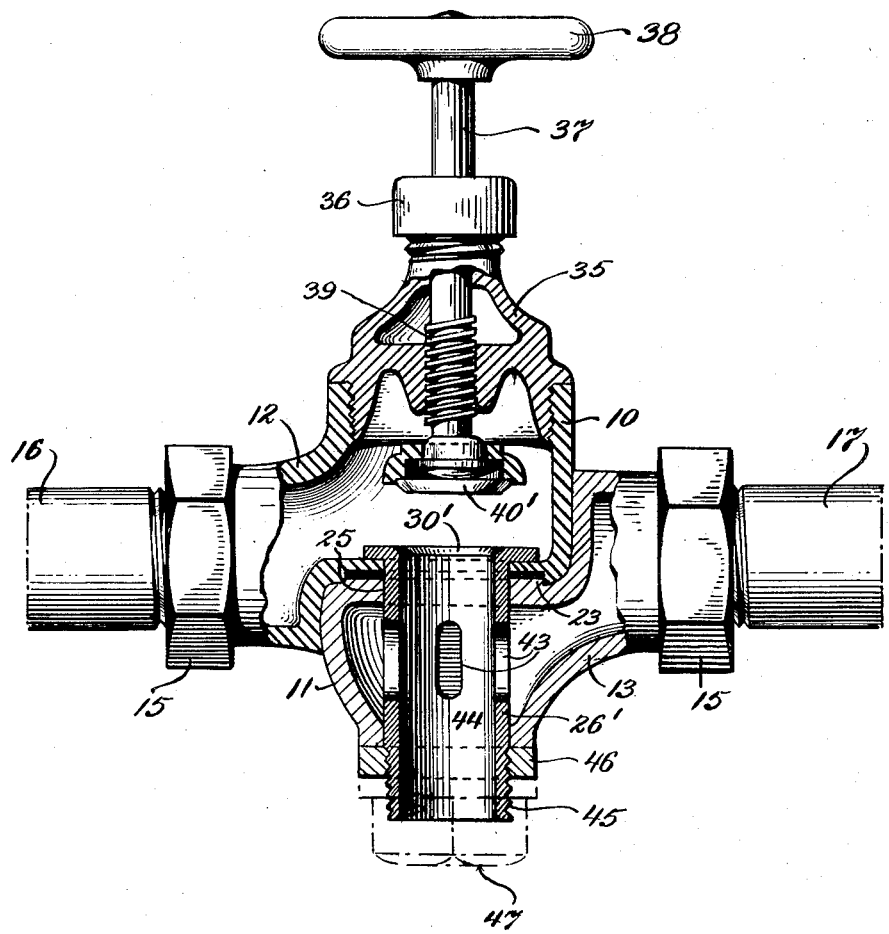
Figure 6:
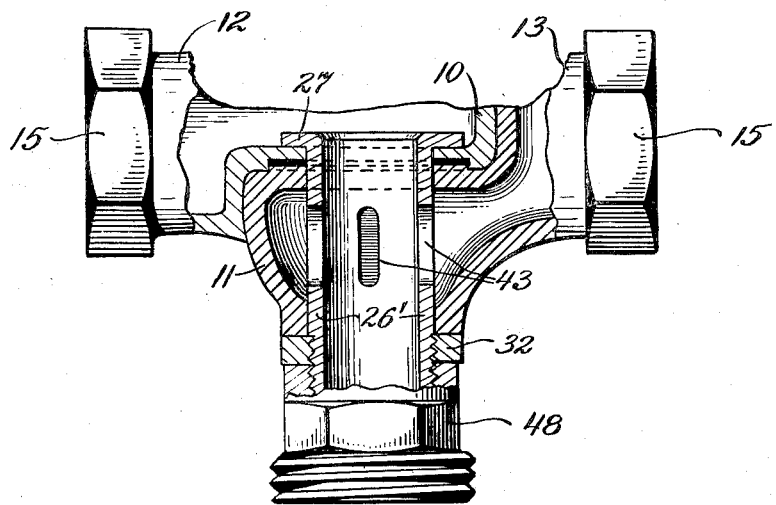
Figure 7:
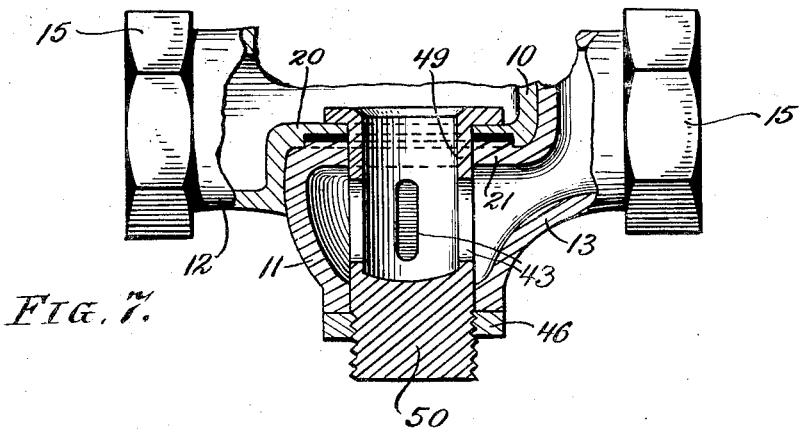

Figure 3 is a plan view of the valve shown in Figure 1 with the valve stem in section, Figure 4 is a similar view but showing the sections of the valve extended at different angular relations from the straight positions shown in Figures 1, 2 and 3, Figure 5 is a view similar to Figure 2 but showing a modification of the seat structure, Figure 6 is a fragmentary sectional elevation on another form of the device and particularly the connection for a three-way valve, and Figure 7 is a similar view showing another form of seat structure and plug for producing a two-way valve corresponding to Figure 5.

Referring to the drawings in detail the improved valve comprises a casing consisting of an upper section 10 and a lower section 11, having ports 12 and 13 tapped internally as indicated at 14, and external wrench engaging surfaces 15. One port serves as an inlet and the other as an outlet and they are adapted for connection to the ends of pipe sections 16 and 17.

Sections 10 and 11 are off-set axially, as indicated at 18 and 19, and provided with flanges 20 and 21. One of these flanges is provided with a depression or seat 22 and the other with a corresponding projection 23 adapted to hold the sections in axial alignment when connected, a gasket or washer 24 being preferably interposed.

The flanges 20 and 21 are apertured centrally, as indicated at 25, to receive a seat-forming sleeve or valve seat member 26 having a top flange 27 bearing on flange 20. The sleeve extends into the section 11 and through an opening 28 in the reduced bottom portion 29 of the section 11, is formed with an upper seat 30 and a lower seat 31, and is threaded externally at its lower end for engagement with a nut 32 and a slip joint or coupling 33, by which a third pipe section 34 may be connected when the device is used as a cross-over or three-way valve.

A bonnet 35 is mounted on section 10 and provided with a packing nut or gland 36 forming a fluid-tight joint for a valve stem 37 which may be manipulated by a handle or wheel 38. The valve stem is connected with the bonnet by a threaded connection 39. The valve stem carries a valve head 40 adapted to engage with the upper valve seat 30 of sleeve 26 and is provided with an extension 41 carrying a valve head 42, in axial alignment with valve head 40, and adapted to engage the lower valve seat 31 of sleeve 26. The sleeve has a series of openings 43, shown as vertical slots, through which the flow of the fluid may be controlled.

The sections are connected by the sleeve 26 and may be firmly drawn together by means of binding nut 32 but are free to move pivotally relatively to each other so that they may be adjusted at different angles. The extent of movement allowed is 180°, so that the ports 12 and 13 may be disposed in alignment to form a straight globe valve or at any desired angle to each other as shown in full and dotted lines in Figure 4 of the drawings. In these positions, the device is adapted for use in corners or cramped places where the use of the ordinary valve and fittings is not practical. By operating the stem 37, the valve heads 40 and 42 will be simultaneously moved into and out of engagement with their respective seats 30 and 31 so that the flow through the three ports, either one as an inlet and the others as outlets, may be effectively controlled.

Instead of providing the internal seat 31 and leaving sleeve 26 open for connection of pipe section 34 as shown in Figure 2 of the drawings, the construction shown in Figure 5 may be employed. In this instance, the stem extension 41, the valve head 42 and the lower valve seat 31 are omitted. The valve head 40' co-operates with the seat 30', the sleeve 26' is provided with an uninterrupted bore 44 and external threads 45 which are engaged by a nut 46 by which the sections of the valve are held in binding relation so that they may be adjusted to different angular positions. The lower open end of the sleeve is closed by a cap nut 47, thus providing a two-way or straight globe valve which may be changed into a right or left angle valve, or a three-way or cross-over valve by eliminating the cap nut 47, providing a connection for a pipe section such as 33 shown in Figure 2, and a separate valve in section 44 to control the flow of fluid therethrough.

In Figure 6 of the drawings, a construction similar to that shown in Figure 5 is illustrated, except that, in lieu of the lock nut 47 which caps over the lower end of the sleeve 26' and closes the bottom passage, a coupling member 48 is attached to the sleeve for connection with a pipe in a similar manner to that shown in Figure 2 of the drawings and which may be controlled in the manner described in connection with Figure 5.

In Figure 7 of the drawings, a modified form of sleeve structure is shown, the sleeve 49 having a closed or solid portion 50 forming a plug to close the bottom passage, thereby producing a straight or two-way valve. In this instance, the nut 46 is employed, and the solid portion of the sleeve serves to close the passage through the reduced portion 29 of the valve casing. In each form of the device, the upper and lower sections of the valve casing may be set at different angular positions with respect to each other within a range of 180°.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A valve including a casing made in sections; pipe connecting means on each section, and means on one section extending through the interior of the other section for connecting the sections whereby the axes of the pipe connecting means may be swingably adjusted.

2. A valve including a casing made in sections; pipe connecting means on each section having aligned axes, and means connecting the sections including pipe connecting means whereby the axes of the first-named pipe connecting means will swing in a common plane.

3. A valve including a casing made in sections; pipe connecting means on each section having aligned axes, and means connecting the sections including pipe connecting means having its axis at right angles to the axes of the first-named pipe connecting means whereby the axes of the first-named pipe connecting means will swing in a common plane.

4. A valve including a casing made in sections, and a valve seat member for holding the sections in swingable engagement with each other.

5. A valve including a casing made in sections; means for holding the sections in axial alignment, and a valve seat member for holding the sections in swingable engagement with each other.

6. A valve including a casing made in sections, each section having a flange, one of the flanges being provided with a projecting part and the other with a corresponding depression whereby the sections may be held in axial alignment, and means passing through the flanges for holding the sections in swingable engagement with each other.

7. A valve including a casing made in sections, each section having a flange, one of the flanges being provided with a projecting part and the other with a corresponding depression whereby the sections may be held in axial alignment, and a valve seat member passing through the flanges for holding the sections in swingable engagement with each other.

8. A valve including a casing made in sections, each section having a flange, one of the flanges being provided with a projecting part and the other with a corresponding depression whereby the sections may be held in axial alignment; a sleeve passing through the flanges, one end of the sleeve being provided with a top flange engaging one of the section flanges and the other end threaded and extending out of the section, and means on the threaded end for holding the sections in engagement with each other.

9. A valve including a casing made in sections; valve controlling means; means for connecting the sections, each of the sections being provided with three ports, one port on one section being adapted to receive the valve controlling means, another port to connect to a pipe and the third port to receive said means for connecting the sections, one of the ports in the other section being adapted to be connected to a pipe and the other two ports to receive said means for connecting the sections, and means connected to the last mentioned means for holding the sections together.

10. A valve including a casing made in sections, one section being provided with pipe connecting means and a port, the other section with pipe connecting means and two ports; a valve seat member passing through the ports, and means on the valve seat member for holding the sections together.

11. A valve including a casing made in sections; a sleeve passing through one of the sections and provided with openings communicating with the interior of the last mentioned section; a top flange on one end of the sleeve extending into and engaging the other section, and means on the other end of the sleeve for holding the sections together.

12. A valve consisting of a casing made in sections; means for holding the sections in axial alignment, and a valve seat member holding the sections in rotatable engagement.

13. A valve consisting of a casing made in sections, the sections having flanges at their meeting portions, one of the flanges being provided with a projecting part and the other with a corresponding depression whereby the sections may be held in axial alignment; a valve seat member connecting the sections, and means engaging said member for holding the sections in fluid-tight engagement.

14. A valve consisting of a casing made in sections, one of the sections having a port and the other section having two ports arranged for pipe connection; a valve seat member having two seats and holding the sections in rotatable engagement, and a valve stem carrying two valve heads each adapted to engage with a valve seat.

In testimony whereof I have signed my name to this specification in the presence of two subscribing witnesses.

HERBERT H. REIBER.

Witnesses:
  ALEXANDER ISYAK,
  CHAS. E. POTTS.